United States Patent [19]

Baumel

[11] Patent Number: 5,083,842
[45] Date of Patent: Jan. 28, 1992

[54] WHEEL STRENGTHENING STRUCTURE AND METHOD

[76] Inventor: Stanley J. Baumel, 34000 Lagoon Dr., Burlington, Wis. 53105

[21] Appl. No.: 569,926

[22] Filed: Aug. 20, 1990

[51] Int. Cl.⁵ .............................................. B60B 21/00
[52] U.S. Cl. .................................... 301/63 R; 301/95; 29/894.35; 29/894.351
[58] Field of Search ................ 301/5 R, 62, 63 R, 65, 301/95–98, 10 R, 11 R, 10 DC, 9 DP; 29/894.32, 894.35, 894.351, 894.352, 894.353, 894.354

[56] References Cited

U.S. PATENT DOCUMENTS

| | | | |
|---|---|---|---|
| 1,597,873 | 8/1926 | Williams | 301/63 R |
| 2,200,361 | 5/1940 | Hunt | 301/97 |
| 3,730,248 | 5/1973 | Beharrell et al. | 301/11 RX |
| 3,758,161 | 9/1973 | Bradley et al. | 301/63 R |
| 4,286,825 | 9/1981 | Sieving | 301/97 X |

FOREIGN PATENT DOCUMENTS

| | | | |
|---|---|---|---|
| 1283109 | 11/1968 | Fed. Rep. of Germany | 301/63 R |
| 2728160 | 1/1978 | Fed. Rep. of Germany | 301/9 DP |
| 2626531 | 8/1989 | France | 301/63 R |
| 0028703 | 2/1988 | Japan | 301/10 R |

*Primary Examiner*—Russell D. Stormer
*Attorney, Agent, or Firm*—Andrus, Sceales, Starke & Sawall

[57] ABSTRACT

A wheel for use in a high performance environment, such as racing, is provided with structure to increase the ability of the wheel to withstand fatigue stresses. The structure comprises an area of increased thickness provided on the rim of the wheel, located adjacent the connection of mounting structure to the inner surface of the rim. The area of increased thickness comprises a crimp formed in the material of the rim providing a recess opening onto the outer surface of the rim, with the recess being substantially filled with weld material. The wheel so constructed has a rim which is reinforced and capable of withstanding high local stresses exerted on the rim during operation by the mounting structure, yet which allows flexibility of the rim. The ability of the wheel to withstand fatigue stresses is dramatically enhanced, providing improved safety and durability without detracting from wheel performance.

10 Claims, 1 Drawing Sheet

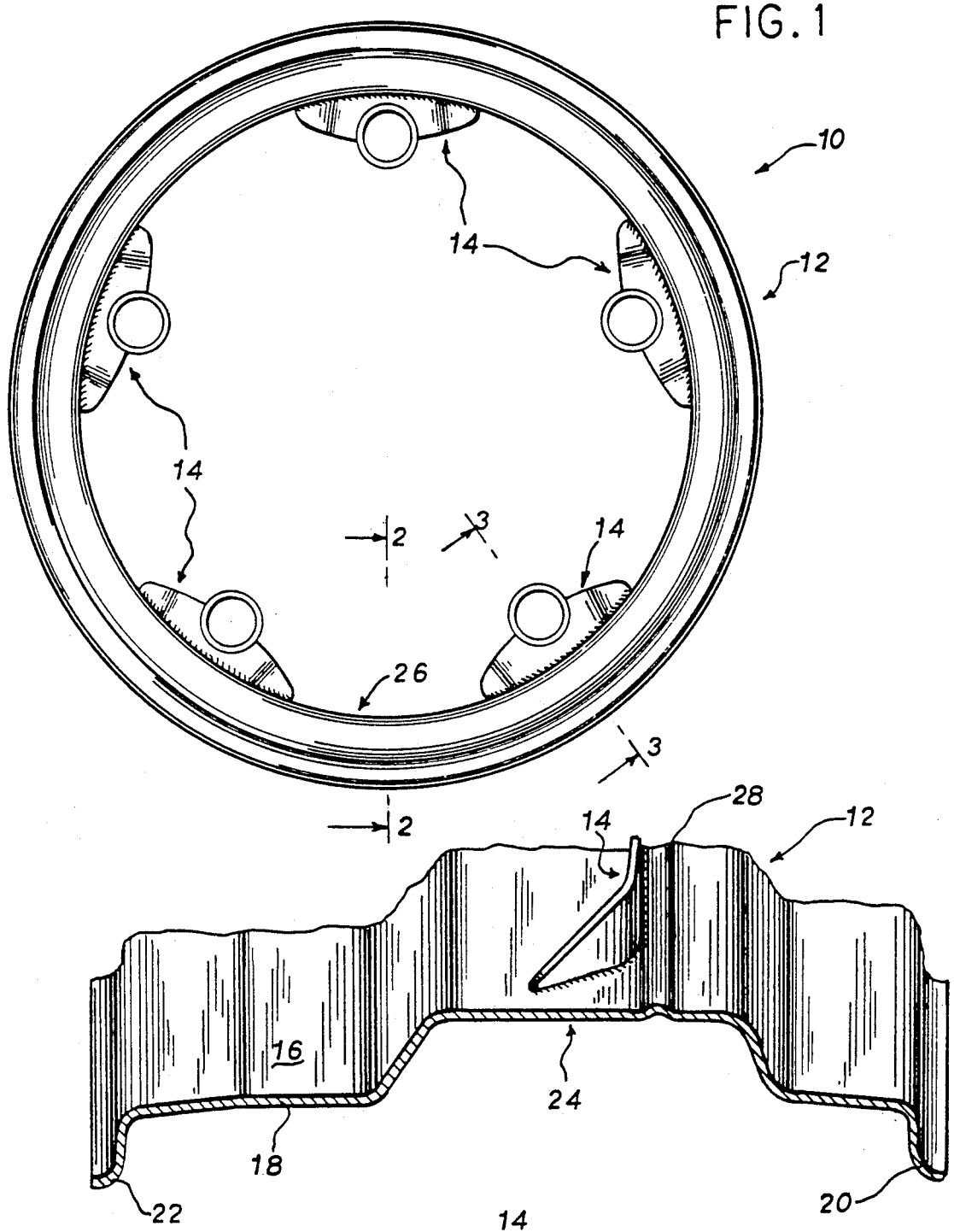

WHEEL STRENGTHENING STRUCTURE AND METHOD

BACKGROUND AND SUMMARY

This invention relates to vehicle wheels, and more particularly to a structure and method for strengthening a vehicle wheel. The invention is particularly useful in an environment in which the vehicle wheel is subjected to high stresses, such as experienced by racing wheels.

In a racing environment, such as high performance stock car racing, the wheels of the car experience high stresses and strains during operation due to high speeds attained by the vehicle. In organized racing, the sanctioning organization sets minimum acceptable standards for certain wheel strength criteria, which must be met by the wheel manufacturer in order for that manufacturer's wheels to be used in a sanctioned race. One test to which such wheels are subjected is a fatigue test, in which a representative wheel is subjected to fatigue stresses simulating those experienced by a wheel during a race. In this type of test, a predetermined moment is applied to the web of the wheel at the location where the wheel would be mounted to the axle of the vehicle, and the wheel is then rotated to simulate race conditions. Alternatively, a testing procedure can be employed such as that disclosed in my co-pending application Ser. No. 07/443,217 filed Nov. 29, 1989 in which the wheel is maintained stationary and the moment is applied through a shaft to which the wheel is mounted, with the load revolving around the shaft. In either case, the number of revolutions before failure of the wheel is measured, and this must meet or exceed standards set by the racing organization in order for that manufacturer's wheel to be acceptable in a sanctioned race.

It is an object of the present invention to provide a wheel structure which provides improved fatigue strength over conventional wheel structures, and a method of making a wheel to provide such improved fatigue strength. It is another object of the invention to provide a wheel for use in a racing environment which is capable of increased endurance under conditions in which severe fatigue stresses are imparted to the wheel, yet which does not detract from the performance of the wheel.

A wheel typically comprises a rim including an inner surface and an outer surface adapted to mount a tire thereto, and mounting structure connected to the inner surface of the rim for mounting the wheel to a vehicle. In accordance with the invention, an area of increased thickness is associated with the rim and extends in a direction circumferentially around the rim, the area of increased thickness is located adjacent the connection of the mounting structure to the rim, and increases the ability of the wheel to withstand fatigue stresses. In one embodiment, the mounting structure comprises a plurality of spaced tabs including openings adapted to receive studs located on a mounting hub, with the tabs being connected to the inner surface of the rim. The area of increased thickness provided to the rim is located adjacent each tab. In a particularly preferred embodiment, the area of increased thickness extends substantially continuously about the circumference of the rim. With a tab-type mounting structure, each tab is connected to the inner surface of the rim adjacent the area of increased thickness. Preferably, the area of increased thickness is located behind the mounting structure, such as the mounting tabs, as viewed when the wheel is mounted to a vehicle.

The area of increased thickness provided to the rim preferably comprises a deformation such as a crimp formed in the rim to create a recess, and weld material disposed within the recess to substantially fill the recess to a level at least flush with the surface of the rim adjacent the recess. The crimp is preferably formed so as to provide a recess which opens onto the outer surface of the rim, with the weld material having a depth sufficient to fill the recess flush with the outer surface of the rim adjacent the recess formed by the crimp.

The invention further contemplates a method of constructing a wheel, substantially in accordance with the foregoing summary. In a preferred mode of carrying out the method, the recess is formed by circumferentially crimping the material of the rim. The mounting structure, e.g. the mounting tabs as summarized above, are then connected to the inner surface of the rim such as by welding. Thereafter, the recess formed by the circumferential crimp is filled with sufficient weld material to substantially fill the recess.

BRIEF DESCRIPTION OF THE DRAWINGS

The drawings illustrate the best mode presently contemplated of carrying out the invention.

In the drawings:

FIG. 1 is an elevation view of a wheel constructed according to the invention, in which the mounting structure connected to the rim comprises a series of mounting tabs;

FIG. 2 is a partial sectional view taken generally along line 2—2 of FIG. 1, showing the crimped rim prior to filling the recess formed by the crimp with weld material;

FIG. 3 is a partial sectional view taken generally along line 3—3 of FIG. 1, showing the recess formed by the crimp filled with weld material.

DETAILED DESCRIPTION OF THE PREFERRED EMBODIMENT

FIG. 1 illustrates a wheel, shown generally at 10, constructed for use in a high-speed racing environment, such as for stock cars which race on paved tracks. Wheel 10 generally comprises a rim, shown at 12, and a series of identical mounting tabs, shown at 14. Rim 12 is preferably formed of a low carbon steel material having an ASTM designation of 1008, although steels ranging from 1006 to 1010 are normally employed and are acceptable in manufacturing rim 12. The thickness of the material of rim 12 typically ranges from 0.090 inches to 0.100 inches. Alternatively, rim 12 may be formed of a steel material designated "HSLA", which is a high strength, low carbon steel relatively light in weight. Likewise, mounting tabs 14 are preferably formed of a low carbon steel material.

Referring to FIG. 2, rim 12 defines an inner surface 16 and an outer surface 18. As is known, a tire is adapted for mounting to outer surface 18 of rim 12, and rim 12 includes inner and outer lips 20, 22, respectively, against which the inner and outer beads of the tire seat for providing an air-tight seal.

Rim 12 further includes a circumferential inwardly recessed area, shown generally at 24 in FIG. 2, and mounting tabs 14 are mounted to the inner surface of inwardly recessed area 24.

An area of increased thickness, shown in FIG. 3 generally at 26, is provided on rim 12 at recessed area 24.

The mounting tabs, such as shown at 14 in FIG. 3, are connected to the inner surface of rim 12 so as to be closely adjacent area of increased thickness 26.

Referring still to FIG. 3, area of increased thickness 26 is formed by a crimp 28 formed in rim 12, which defines an outwardly facing recess on rim 12, with the recess so formed being filled by weld material, shown at 30.

To construct wheel 10 as shown in FIGS. 1-3, rim 12 without mounting tabs 14 connected thereto is first circumferentially crimped inwardly at recessed area 24, as shown at 28 in FIG. 2. Crimp 28 is formed about the entire circumference of rim 12, and provides an outwardly facing recess having a depth ranging from approximately 0.065 inches to 0.075 inches. Preferably, the recess has a depth toward the shallower end of this range. The width of the recess formed by crimp 28 is approximately 0.625 inches.

Crimp 28 may be formed in any satisfactory manner, as will be apparent to one of ordinary skill in the art. Illustratively, crimp 28 may be formed by placing rim 12 between a series of inner and outer rollers, with an outer crimping roller being urged inwardly to form crimp 28 upon rotation of rim 12.

After crimp 28 is formed, mounting tabs 14 are connected to inner surface 16 of rim 12 by welding or the like. As shown in FIGS. 2 and 3, mounting tabs 14 are located closely adjacent crimp 28, and the inner weld material, shown at 32, which cooperates with outer weld material 34 to maintain mounting tab 14 in position on rim 12, actually overlaps crimp 28 on rim 12.

After mounting tabs 14 are welded to inner surface 16 of rim 12, the outwardly facing recess formed by crimp 28 is filled throughout its circumference with weld material 30. This operation can be performed in any satisfactory manner. In a preferred embodiment, an automatic welding apparatus is utilized in which wheel 10 is rotated while an electric arc welding operation is undertaken to deposit weld material 30 in the recess formed by crimp 28. This procedure again is well known in the art.

The welding wire employed to deposit weld material 30 in the recess formed by crimp 28 is preferably a standard general purpose welding wire such as manufactured by Lincoln under its designation L56, conforming to AWS standard A5-18.

The wheel 10 constructed by the process described to provide the described structure exhibits dramatically improved ability to withstand fatigue stresses in use than a conventional wheel without the area of increased thickness 26 provided on the rim. For example, when a tab-type wheel such as is illustrated in FIG. 1 but constructed without area of increased thickness 26 on the rim is subjected to a fatigue stress test on a testing apparatus as described in my co-pending application Ser. No. 07/443,217, the wheel typically withstands approximately 15,000 cycles before failing. An identical wheel provided with area of increased thickness 26 on rim 12, subjected to the same test, is capable of withstanding approximately 250,000 cycles before failing. A standard fatigue stress test situation involves applying a revolving moment of approximately 3,000 foot pounds to the wheel. In one example, a wheel 10 constructed according to the invention was subjected to a 3,000 foot pound moment and withstood approximately 250,000 cycles without failing. The moment was then increased to 3,500 foot pounds, and the wheel withstood another 100,000 cycles before failing. These examples illustrate the dramatic increase in the ability of a wheel constructed according to the invention to withstand fatigue stress. Since the invention does not interfere with the mounting of a tire to the wheel or mounting of the wheel to a vehicle, and does not add appreciably to the weight of the wheel, the overall performance of the wheel in all respects is not adversely affected. The invention increases the overall safety of racing wheels while adding little to the cost of a wheel or to the weight of the wheel.

It is believed that the significant increase in the ability of the wheel to withstand fatigue stresses is a result of the rim of the wheel being stiffened by the presence of the area of increased thickness, and by reinforcing the area at which the mounting tabs are connected to the wheel, while still allowing flexibility of all wheel components. That is, the local stresses imparted to the rim by the mounting tabs, which flex due to forces exerted thereon by the hub, are better withstood by the rim with the area of increased thickness provided thereon adjacent the connection of the mounting tabs to the wheel. The area of increased thickness is preferably formed so as not to provide too much rigidity to the rim, which could occur if the crimp were formed so as to provide a deep recess which is then filled with weld material. In this situation, the rim would be stiffened excessively and would detract from the flexibility of the rim, which is an important component of the ability of the wheel to withstand fatigue stresses.

Various alternatives and embodiments are contemplated as being within the scope of the following claims particularly pointing out and distinctly claiming the subject matter regarded as the invention.

I claim:

1. A wheel, comprising:
    a rim including an inner surface and an outer surface adapted to mount a tire thereto;
    mounting structure connected to the inner surface of the rim for mounting the wheel to a vehicle; and
    an area of increased thickness associated with the rim and being located adjacent the connection of the mounting structure to the rim, to increase the ability of the wheel to withstand fatigue stresses, wherein the area of increased thickness comprises a crimp formed in the rim providing a recess opening onto one of the surfaces of the rim, and weld material disposed within the recess to substantially fill the recess.

2. The wheel of claim 1, wherein the mounting structure comprises a plurality of spaced tabs connected to the inner surface of the rim, and wherein an area of increased thickness is provided to the rim adjacent each tab.

3. The wheel of claim 2, wherein the area of increased thickness extends substantially continuously about the circumference of the rim, with each tab being connected to the inner surface of the rim adjacent the area of increased thickness.

4. The wheel of claim 1, wherein the area of increased thickness is provided on the rim in a location so as to be behind the connection of the mounting structure to the rim as viewed when the wheel is mounted to a vehicle.

5. The wheel of claim 1, wherein the crimp is formed on the rim so as to extend circumferentially around the rim, and wherein the weld material is disposed within the recess formed by the crimp throughout the length of the recess.

6. The wheel of claim 5, wherein the ratio of the depth of the recess provided by the crimp to the thickness of the rim falls approximately in the range of from 0.65 to 0.83.

7. The wheel of claim 6, wherein the rim has a thickness ranging from approximately 0,090 to 0.100 inches, and wherein the crimp provides a recess having a depth ranging from approximately 0.065 to 0.075 inches.

8. A method of constructing a wheel, comprising the steps of:
providing a rim having an inner surface and an outer surface adapted to mount a tire thereto;
connecting mounting structure to the inner surface of the rim for mounting the wheel to a vehicle; and
providing an area of increased thickness to the rim adjacent the connection of the mounting structure to the rim to reinforce the rim and to increase the ability of the wheel to with stand fatigue stresses, by circumferentially crimping the rim to form a continuous recess around the circumference of the rim which opens onto one of the surfaces of the rim, and substantially filling the recess throughout its length with weld material sufficient to fill the recess at least flush with the surface of the rim adjacent the recess.

9. The method of claim 8, wherein the step of providing an area of increased thickness to the rim is carried out such that the area of increased thickness is located on the rim behind the connection of the mounting structure to the rim as viewed when the wheel is mounted to a vehicle.

10. A method of constructing a wheel, comprising the steps of:
providing a rim having an inner surface and an outer surface to which a tire is adapted for mounting;
providing an area of increased thickness to the rim by forming a circumferential crimp in the rim to form a recess and filling the recess with weld material; and
connecting a plurality of mounting tabs to the inner surface of the rim adjacent the circumferential crimp prior to filling the recess with weld material;
wherein the area of increased thickness increases the ability of the wheel to withstand fatigue stresses.

* * * * *